US012778725B2

(12) United States Patent
Kirsanske et al.

(10) Patent No.: US 12,778,725 B2
(45) Date of Patent: Nov. 3, 2026

(54) INTRAORAL SCANNER WITH INTEGRATED COOLING

(71) Applicant: 3SHAPE A/S, Copenhagen K (DK)

(72) Inventors: Gabija Kirsanske, Copenhagen K (DK); Finn Hansen, Copenhagen K (DK); Mads Grønlund Andersen, Copenhagen K (DK); Sebastian Friborg Molbech, Copenhagen K (DK)

(73) Assignee: 3SHAPE A/S, Kobenhavn K (DK)

( * ) Notice: Subject to any disclaimer, the term of this patent is extended or adjusted under 35 U.S.C. 154(b) by 349 days.

(21) Appl. No.: 18/707,655

(22) PCT Filed: Nov. 8, 2022

(86) PCT No.: PCT/EP2022/081109
§ 371 (c)(1),
(2) Date: May 6, 2024

(87) PCT Pub. No.: WO2023/079169
PCT Pub. Date: May 11, 2023

(65) Prior Publication Data

US 2026/0157824 A1 Jun. 11, 2026

(30) Foreign Application Priority Data

Nov. 8, 2021 (EP) .................................... 21206934

(51) Int. Cl.
*A61C 9/00* (2006.01)
*F28F 3/02* (2006.01)
*H05K 7/20* (2006.01)

(52) U.S. Cl.
CPC ............. *A61C 9/0053* (2013.01); *F28F 3/02* (2013.01); *H05K 7/20163* (2013.01)

(58) Field of Classification Search
CPC .. H05K 7/20163; A61C 9/0053; A61C 19/04; A61B 1/00032; A61B 1/015;
(Continued)

(56) References Cited

U.S. PATENT DOCUMENTS 6,885,555 B2 * 4/2005 Greco ................ H05K 7/20163
165/104.11
11,202,560 B2 * 12/2021 Chang .................. A61B 1/0676
(Continued)

FOREIGN PATENT DOCUMENTS

EP 4215149 A1 7/2023
KR 20220037375 A * 3/2022 .............. A61L 2/10
(Continued)

OTHER PUBLICATIONS

Office Action (Communication) issued on Jun. 10, 2025, by the European Patent Office in corresponding European Patent Application No. 22 814 348.3. (6 pages).
(Continued)

*Primary Examiner* — Jayprakash N Gandhi
(74) *Attorney, Agent, or Firm* — Buchanan Ingersoll & Rooney PC

(57) ABSTRACT

The present disclosure relates generally to thermal management of a scanner, in particular a cooling system for a scanner. More specifically the present disclosure relates to a scanner wherein the cooling system is integrated, in particular a wireless intraoral scanner with integrated cooling. The present disclosure further relates to method for cooling the scanner. One embodiment relates to an intraoral scanner for scanning a dental object, comprising an outer shell housing defining a longitudinal axis of the scanner, the outer shell housing accommodating electronic components generating heat during use, and a cooling system for removing heat
(Continued)

from the electronic components, the cooling system comprising a heat exchanger, such as a heat sink, and a fan.

17 Claims, 15 Drawing Sheets

(58) Field of Classification Search
CPC ....... A61B 1/00172; A61B 1/128; A61B 1/24; A61B 5/0088
See application file for complete search history.

(56) References Cited

U.S. PATENT DOCUMENTS

| | | | | |
|---|---|---|---|---|
| 11,583,166 | B2 * | 2/2023 | Tanaka | A61B 1/00096 |
| 11,751,758 | B2 * | 9/2023 | Lin | A61B 1/00124 348/66 |
| 12,357,718 | B2 * | 7/2025 | Lee | A61C 9/0053 |
| 2020/0069168 | A1 * | 3/2020 | Tanaka | A61B 1/253 |
| 2020/0069169 | A1 | 3/2020 | Tanaka et al. | |
| 2020/0315434 | A1 | 10/2020 | Kopelman et al. | |
| 2026/0000299 | A1 * | 1/2026 | Hansen | A61B 1/128 |

FOREIGN PATENT DOCUMENTS

| | | | | |
|---|---|---|---|---|
| KR | 20250066329 A * | 5/2025 | | G06T 1/0007 |
| WO | 2022060133 A1 | 3/2022 | | |

OTHER PUBLICATIONS

International Search Report (PCT/ISA/210) and Written Opinion (PCT/ISA/237) mailed on Feb. 10, 2023, by the European Patent Office as the International Searching Authority for International Application No. PCT/EP2022/081109, 11 pages.

* cited by examiner

INTRAORAL SCANNER WITH INTEGRATED COOLING

The present disclosure relates generally to thermal management of a scanner, in particular a cooling system for a scanner. More specifically the present disclosure relates to a scanner wherein the cooling system is integrated, in particular a wireless intraoral scanner with integrated cooling. The present disclosure further relates to a method for cooling the scanner.

BACKGROUND

Thermal management is well-known in the art of computing devices, such as in computers and/or 3D scanning devices. The continuous development of scanning technology, and in particular intraoral scanner, provides a plurality of technical enhancements aiming at faster and more precise performance. To ensure power efficiency and minimal loss, the electronic components tend to be tightly packed leading to localized high concentration of thermal energy, and thus hotspots on the exterior surface. Thermal management in an intraoral scanner must ensure that the scanner exterior surface temperature does not exceed the safe limits according to the certain standards for medical devices. In particular, the surface of the shell of a medical device must not exceed 50° C., or even 48° C., sometimes even 41° C. The challenge in thermal management is elevated by the need to dissipate heat exhausted in more powerful data acquisition, e.g. higher frame rate image sensor, processing electronics, wireless operation, etc. At the same time the trend is that the scanner itself becomes smaller and smaller.

SUMMARY

The heat emitted in the high-power electronics can be limited by throttling the device performance. However, the technological ambition is to maintain the intended high performance, and it is instead preferred to implement efficient thermal management. A small intraoral scanner size implies very limited space between the internal heat generating components and the outer enclosure. Excess heat must be removed from the device by, e.g. utilizing a fan that creates the required volumetric air flow at a given pressure. The given pressure and the available air flow depend on the airway space, which is a challenge for compact scanners. Accordingly, there is a need for better power management of scanners, particularly wireless intraoral scanners.

The present disclosure relates to an intraoral scanner for scanning a dental object, comprising an outer shell housing defining a longitudinal axis of the scanner. The longitudinal axis of the scanner extends between a proximal end (back end) of the scanner towards the user of the scanner, and a distal end (front end) of the scanner for entering the oral cavity of the subject being scanned. The outer shell housing accommodates electronic components generating heat during use of the scanner, components such as a battery, a light source, an image sensor, a WiFi module, a power management integrated circuit (PMIC) and/or a field-programmable gate array (FPGA). The preferred embodiment comprises the presently disclosed cooling system for removing heat from the scanner, in particular removing heat from heat generating electronic components of the scanner. In preferred embodiments, the cooling system comprises a heat exchanger, such as a heat sink, and preferably also a fan. The heat exchanger is advantageous for dissipating heat from components generating heat during use, and the fan is good from generating a flow of air, in particular for cooling the heat exchanger.

In some embodiments, the intraoral scanner comprises:

- a heat exchanger for removing heat from one or more electronic components located within the scanner, wherein said heat is generated heat during use of the scanner,
- an axial-flow fan having a shaft with blades defining an axis of rotation, wherein the axial-flow fan is configured to force air to move through the fan in a direction substantially parallel to the axis of rotation, wherein the axis of rotation is parallel with a horizontal plane of the scanner;
- an air inlet, an air outlet, an inlet passage, and an outlet passage, wherein the inlet passage extends between the air inlet and the heat exchanger, and wherein the outlet passage extends between the heat exchanger and the air outlet, and wherein the air inlet and the air outlet are separated and located in a proximal end of the intraoral scanner.

No matter where the heat is dissipated to, the outer shell housing of the scanner then advantageously allows for some air flow to remove the heat from the heat exchanger and still prevent user contact with any hot surfaces. In that regard the cooling system preferably comprises an inlet passage and an outlet passage, i.e. inside the outer shell housing. The inlet passage preferably extends between an air inlet and the heat exchanger, whereas the outlet passage preferably extends between the heat exchanger and an air outlet. The inlet passage and/or the outlet passage may be extending parallel with the longitudinal axis of scanner. The inlet and outlet passage may be located in the same plane, such as in a horizontal plane. Advantageously, the air inlet and the air outlet are separated and located in the proximal end of the scanner. Hence, by means of the fan, air from the surroundings can be sucked into the inlet passage through the air inlet in the proximal end of the scanner, pass through the inlet passage to the heat exchanger, exchange heat with the heat exchanger such that thermal energy is transferred from the heat exchanger to the air flowing by into the outlet passage and then out through the air outlet in the proximal end of the scanner.

Airway openings in the proximal end of the scanner allows for the remaining part of the outer shell of the scanner to remain tightly fitted on the interior of the scanner allowing for a compact and ergonomic design. Air inlet openings in the proximal end of the scanner also provides compliance with improved hygienic standards because airway openings, where contamination may occur and adequate cleaning may not be feasible, are not necessary at arbitrary positions of the outer shell housing. Hence, in the preferred embodiment of the presently disclosed scanner the only openings in the outer shell housing are in the proximal end, where a battery interface also can be provided.

The present disclosure further relates to a method for cooling a scanner, in particular the presently disclosed intraoral scanner, the method comprising the steps of:

- sucking air through an air inlet in a proximal end of the intraoral scanner to a heat exchanger,
- passing the air from the air inlet through an inlet passage,
- guiding the air from the inlet passage past and/or through the heat exchanger, and to an outlet passage, passing the air through the outlet passage to an air outlet in the proximal end of the scanner, and blowing the air out of the scanner through the air outlet.

DESCRIPTION OF THE DRAWINGS

The invention will in the following be described in greater detail with reference to the accompanying drawings.

DETAILED DESCRIPTION

Figure 1:
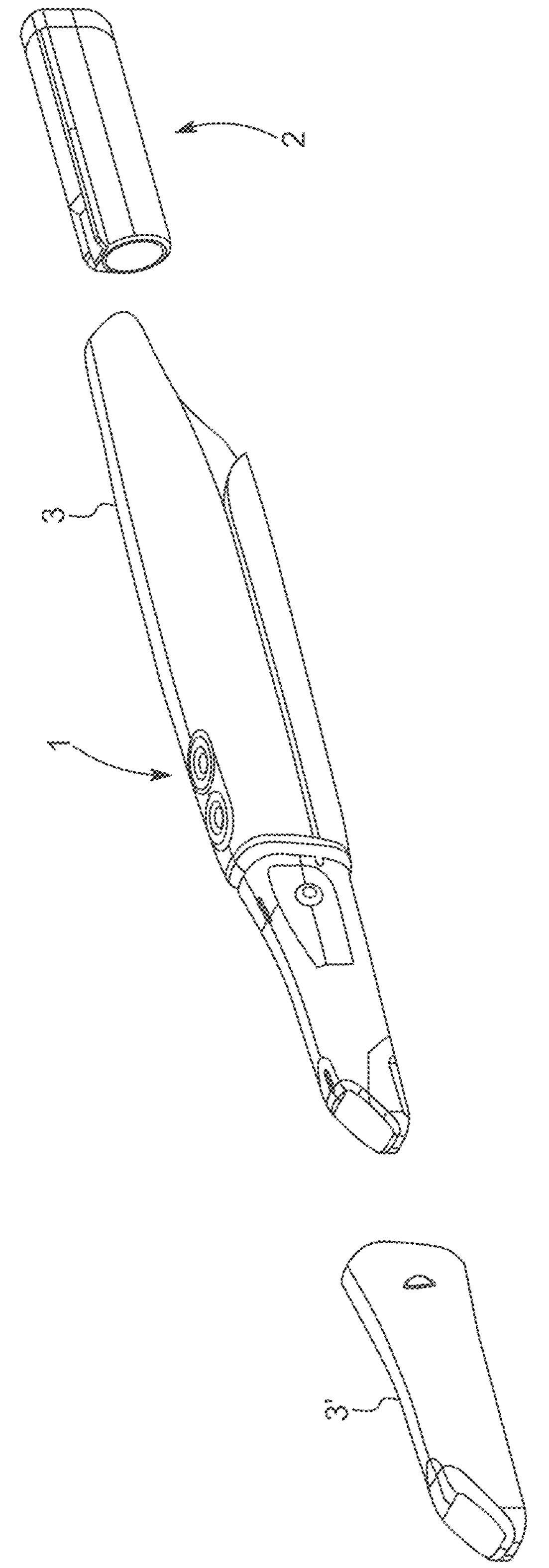
FIG. 1 is an exploded perspective view of one embodiment of the presently disclosed intraoral scanner.

The presently disclosed cooling approach where heat is efficiently transported out of the scanner has made it possible to operate the scanner at full throttle without heating up the outer shell housing above the required temperature and without introducing any airway holes in the outer shell housing thereby improving the hygienic standards.

In the preferred embodiment the fan is configured for blowing air past and/or through the heat exchanger such that the heat exchanger is constantly cooled by air. In particular, the fan can be mounted at least partly, or fully, inside the heat exchanger, as exemplified in FIGS. 8A-8D.

In the wireless version of the scanner the battery may be elongated to conform to the longitudinal extension of the scanner. The battery preferably extends along the longitudinal axis of the scanner such that the inlet passage and preferably also the outlet passage, may extend along the battery whereby a flow of air can be provided along the battery, possibly to improve cooling of the battery which also may generated heat during use.

In the preferred embodiment the scanner is configured such that during cooling operation the fan 1) sucks air through the inlet passage along a first direction of the longitudinal axis, such that the air passes the heat exchanger to cool the heat exchanger and heat the air, and 2) blows the heated air though the outlet passage along a second direction of the longitudinal axis which is opposite to the first direction.

The heat exchanger and the orientation and location of the fan are preferably configured such that during cooling operation air enters through the inlet passage to the heat exchanger along a first direction of the longitudinal axis, and exits from the heat exchanger through the outlet passage along a second opposite direction of the longitudinal axis. I.e. the heat exchanger and the orientation and location of the fan may be configured such that during transport from the inlet passage to the outlet passage, via the fan and the heat exchanger, the flow of the air is reversed 180 degrees.

One issue with prior art cooling system designs employing an axial flow fan parallel with the longitudinal axis of the scanner is recirculation of heated air in the scanner, and measurements have shown that air is flowing above the fan, below the fan, above the main board, between fan and battery guide, and between heat exchanger and outer shell housing. This can also be seen in that the flow rate through the fan is 26.9 L/min, whereas only 8.9 L/min is sucked through the air inlet. Hence, only a third of the air in the scanner is actually cold air from the outside and a key issue in improving thermal management is to reduce the recirculation of heated air.

In order to ensure effective thermal management it is important that sufficient air is sucked into the outer shell housing, but as also stated above it is even more important that heated air is transported out of the outer shell to reduce recirculation of heated air. One way of ensuring that is that the inlet passage and the outlet passage are physically separated passages, (except around heat exchanger where air is guided from the inlet passage to the outlet passage), such that inlet air for cooling and heated outlet air are kept in separated passages. Thermal management can also be improved by sealing the inlet passage and/or the outlet passage to prevent air leaks and/or recirculation of air.

Another way of improving thermal management can be by providing sealing, e.g. a rubber sealing, extending along the longitudinal axis and configured for separating a first part of the cooling system from a second part of the cooling system, and wherein the inlet passage is located in the first part of the cooling and the outlet passage is located in the second part of the cooling system. For example by at least partly sealing the inlet passage and/or in particular the outlet passage, for example by at least one elongated rubber sealing. This helps to ensure that cold and warm air are separated and reduce recirculation of hot air inside the scanner. The first part of the cooling system can be the right part or the upper part of the scanner, vs. the second part of the cooling system which can be the left part or the bottom part of the scanner, respectively. The separation of the air passages can also be provided by having the air passages on opposite side of the battery, such that the inlet passage and the outlet passage are physically separated (at least partly) by the battery.

There are various ways to draw cool air into and expel heated air out form the outer shell housing. One of the most efficient ways is to use a fan, in particular an axial-flow fan having a shaft with blades defining an axis of rotation, wherein the axial-flow fan is configured to force air to move parallel to the axis of rotation. An axial-flow fan may be understood as a fan wherein the inlet air and the expelled air is substantially parallel. In other words, in an axial-flow fan the expelled air is typically somewhat parallel to the axis of rotation. This is in contrast to e.g. a blower fan, wherein air is sucked into the fan in a direction substantially parallel to the axis of rotation, but the expelled air has a completely different direction than the axis of rotation e.g. approximately orthogonal to the axis of rotation of the blower fan. An advantage of using an axial-flow fan is that it consumes less electricity than a blower fan. Another advantage in the present context is that it enables the reverse of the air flow within the scanner, such that the expelled air can be directed along an air outlet out of a proximal (rear) end of the intraoral scanner. The ensures that the air flow is directed away from the patient's mouth during use, whereas e.g. blowing heated air into the patient's mouth is not pleasant nor hygienic.

One of the advantages of the presently disclosed cooling approach is that the air inlet and air outlet can be provided in the proximal end (back end) of the scanner. However, this somehow requires that the flow direction of the air is turned 180 degrees inside outer shell housing. One way of controlling the flow direction of air is if the fan, in particular in case of an axial-flow fan, defines an axis of rotation which is non-parallel with the longitudinal axis, preferably such that the fan's axis of rotation forms an angle with the longitudinal axis of between 45 and 90 degrees, more preferably between 60 and 90 degrees, even more preferably between 70 and 80 degrees, yet more preferably between 80 and 90 degrees, most preferably substantially perpendicular to the longitudinal axis. FIG. 10B shows an embodiment, wherein the axis of rotation of the fan is perpendicular to the longitudinal axis of the scanner. FIG. 10C shows an embodiment, wherein the axis of rotation of the fan defines an angle of between 70 and 80 degrees, approximately 75 degrees, with respect to the longitudinal axis of the scanner.

In a further embodiment of the scanner a right side and a left side of the outer shell housing, seen from the proximal end of the scanner, defines a horizontal axis of the scanner, and wherein a top side and a bottom side of the outer shell housing defines a vertical axis of the scanner, and wherein the fan defines an axis of rotation which is non-parallel with the longitudinal axis and parallel with the horizontal axis, such that the fan's axis of rotation forms an angle with the longitudinal axis of between 45 and 90 degrees, more preferably between 60 and 90 degrees, even more preferably between 70 and 80 degrees, most preferably between 80 and 90 degrees. The horizontal axis may lie in a horizontal plane of the scanner, and the vertical axis may lie in a vertical plane of the scanner.

The axis of rotation of the fan may in some embodiments be parallel to a horizontal plane 27. The axis of rotation may further define an angle with respect to a vertical plane 28. The two planes are illustrated along with the scanner in FIG. 14. The planes (27, 28) may be orthogonal to each other. The longitudinal axis of the scanner may be coincident with the horizontal and/or the vertical plane. The axis of rotation of the fan may be non-parallel with the vertical plane 28, preferably such that the fan's axis of rotation forms an angle with the vertical plane of between 45 and 90 degrees, more preferably between 60 and 90 degrees, even more preferably between 70 and 80 degrees, yet more preferably between 80 and 90 degrees, most preferably substantially perpendicular to the vertical plane. FIG. 10B shows an embodiment, wherein the axis of rotation of the fan is perpendicular to the vertical plane 28 of the scanner. FIG. 10C shows an embodiment, wherein the axis of rotation of the fan defines an angle of between 70 and 80 degrees, approximately 75 degrees, with respect to the vertical plane 28.

It should be noted that, in the examples above, the angle is measured between a vector in the plane and the axis of rotation of the fan. If the angle is instead measured between a surface normal of the plane 28, the values of the angle in the examples above changes. Thus, the fan's axis of rotation may form an angle with a surface normal of the vertical plane of between 0 and 45 degrees, more preferably between 0 and 30 degrees, even more preferably between 10 and 20 degrees, yet more preferably between 0 and 10 degrees, most preferably substantially parallel to a surface normal to the vertical plane. FIG. 10B shows an embodiment, wherein the axis of rotation of the fan is parallel to a surface normal of the vertical plane 28. FIG. 10C shows an embodiment, wherein the axis of rotation of the fan defines an angle of between 10 and 20 degrees, approximately 15 degrees, with respect to a surface normal of the vertical plane 28.

A fan gasket may advantageously be provided for surrounding the fan. The fan may provide the only connection between the inlet passage and outlet passage and the gasket can then be configured for providing sealing between the inlet passage and the outlet passage such that air passage between inlet and outlet passages is exclusively through the fan.

Heat Dissipation Element

The primary heat sources in the presently disclosed scanner can for example be a processing unit, e.g. an FPGA, imaging sensor, illumination module, an integrated circuit, e.g. a PMIC, and a Wi-Fi Module. Energy generated during scanning must be removed efficiently out of the scanner to keep an acceptable temperature at the outer shell surface and internally such that components do not exceed their critical temperature threshold inside the scanner. The heat generated by the electronic components is preferably efficiently transferred to the heat exchanger. In that regard the presently disclosed cooling system preferably comprises one or more heat dissipation elements. And the cooling system is preferably configured such that most or all of the heat generating (electronic) component are cooled by means of thermal conduction between said one or more heat dissipation elements and the heat exchanger, which can be cooled efficiently by the fan. The heat dissipation elements can have different shapes and/or materials, selected for the purpose, such that they extend between heat generating components and the heat sink. Hence, the presently disclosed intraoral scanner is preferably configured such that the electronic components are primarily cooled by thermal conduction between at least one heat dissipation element and the heat exchanger, whereas the heat exchanger is primarily cooled by air.

Thermal management can be further improved by means of rigorous thermal coupling of the electronic components and a heat dissipation element, e.g. by use of thermal gap fillers, thermal paste, and physical clamping, to ensure thermal contact In case of a wireless scanner the wireless transmission module, e.g. a Wi-Fi module, is typically located in the proximal end of the scanner, and an elongated heat dissipation element can then take care of the thermal conduction between the wireless transmission module and the heat sink for efficient cooling of the wireless transmission module. The elongated heat dissipation element can for example extend along the inlet passage.

In case of a metallic heat dissipation element it can also be utilized for defining the ground plane of a main circuit board of the scanner. Hence, one embodiment of the presently disclosed intraoral scanner comprises an elongated heat dissipation element in the form of a thermally conductive and electrically conductive plate, preferably metallic, such as made of copper, and connected to a ground plane of a main board of the intraoral scanner. The elongated heat dissipation element may be connected to the ground plane in a plurality of connecting points, e.g. by means of clips, such as copper clips. Neighboring connecting points can be separated by less than 30 mm.

Copper clips will have a double function. The primary function will be heat transport between component and heat dissipation element. Secondary, copper clips can be a part of an EMC protection design. By connecting to the ground plane at the mainboard in many points with a maximum distance, copper clips will protect against spreading out undesirable EMC noise. The maximum distance is preferably less than 30 mm.

Increased efficiency in the thermal management can be provided if at least part of the heat dissipation element is a thermal interface material (TIM) based on graphite. The graphite-based heat dissipation element may for example be thermally connected to an image sensor and/or a field-programmable gate array (FPGA), which is some of the electronic components that generates the most heat during use of the scanner.

Heat Exchanger Design

The heat exchanger, which can be a heat sink, is a reservoir absorbing heat from heat generating components and contains a surface area sufficiently large to efficiently transfer heat to the air around the heat exchanger. The air absorbs the heat and if this air is constantly replaced with cooler air, e.g. by means of a fan-driven air flow, the thermal management of the scanner becomes very efficient. Hence, the purpose of the heat sink is to remove as much as possible of thermal energy when air is passing through the heat exchanger. In that regards it is important to guide airflow through the heat exchanger with a minimum of flow loss. It is also important to prevent air leak between inlet passage and the outlet passage such that the air flow, and the thermal energy transport, can be transported in a controlled manner.

An intraoral scanner comprises a lot of electronic components packed in a compact design, and it is therefore important to guide the airflow as best as possible. In particular, it is important to efficiently guide the airflow out of the scanner because the airflow is in particular provided to cool the heat exchanger and after passage of the heat exchanger the air, which has been heated by the heat exchanger, has fulfilled its purpose and is therefore advantageously guided efficiently out of the scanner before it is recirculated inside the scanner.

One way of improving the outflow of air is to shape the heat exchanger, for example by using mechanic air guides, in order to control the flow direction before, through and after the heat exchanger and secure a laminar flow, i.e. minimize turbulence, especially at the outlet air flow. In particular the inventors have realized that mounting of an axial-flow fan substantially perpendicular to the longitudinal axis of the scanner, it is possible to design a compact and efficient cooling of the scanner, where the air flow can be turned 180 degree from the inlet passage to the outlet passage, without significant turbulence and air pocket formation and thereby minimal drop in air-flow across the heat exchanger. Also, an asymmetric design of the heat exchanger can improve thermal management.

The fan typically separates the air inflow side from the air outflow side in the heat exchanger. The fan can for example be a 20×20×10 mm axial flow fan, integrated in a heat sink placed in front of a replaceable battery. The heat exchanger may be formed from a single piece of material.

Figure 5:
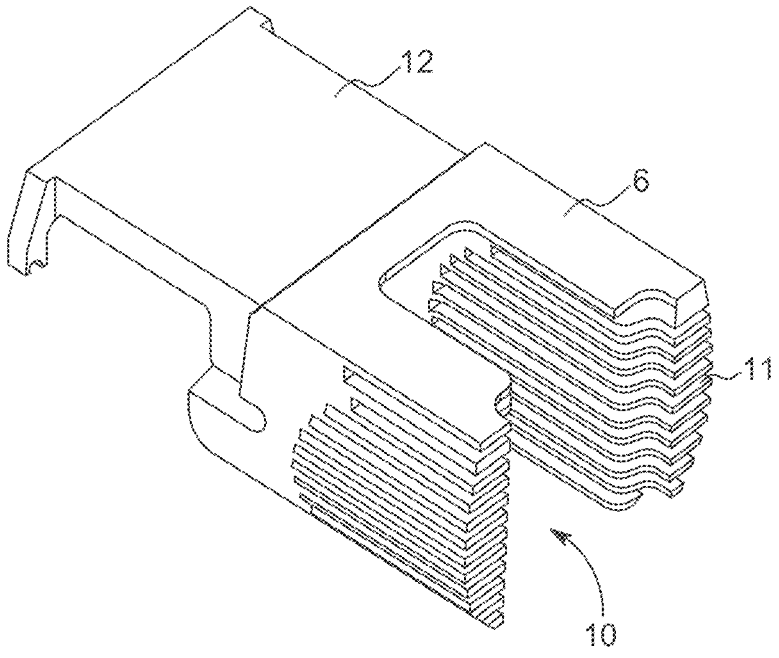
FIG. 5 is a perspective view of an exemplary heat exchanger.
Figure 6A:
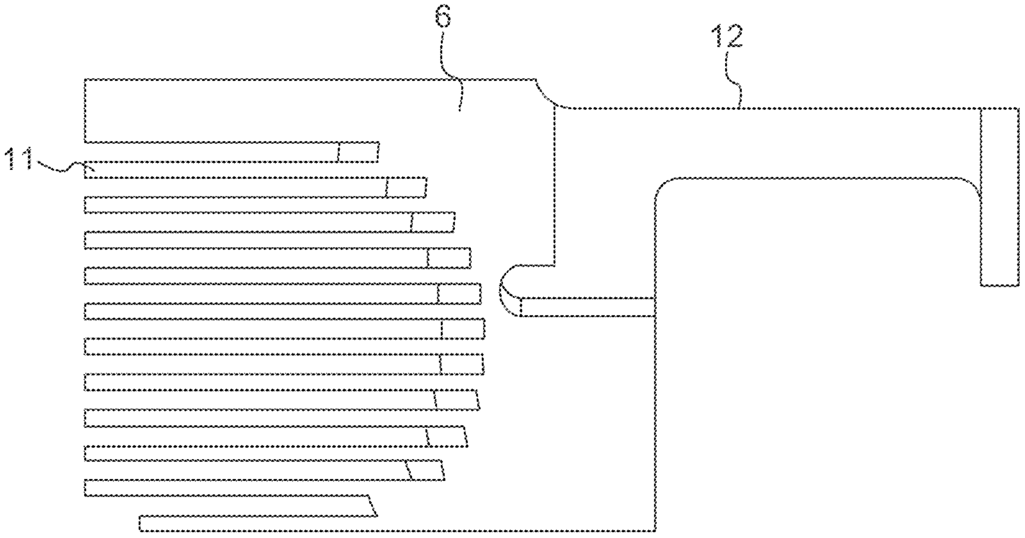
FIGS. 6A-B show side and proximal views of the heat exchanger of FIG. 5.
Figure 6B:
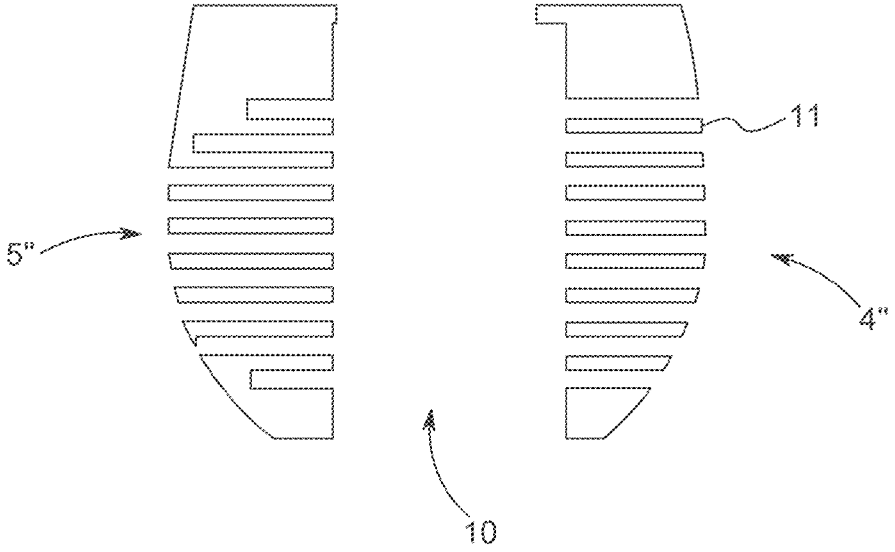

The heat exchanger may comprise an air inflow side (towards the inlet passage) and an air outflow side (towards the outlet passage) and wherein the air inlet side is different from the air outlet side such that the heat exchanger is asymmetric. The heat exchanger can be designed in various materials with good thermal properties. The heat exchanger can be milled in one piece of metal or built by stacked plates, mechanical or glue bonded together. The heat exchanger preferably comprises fins for increasing the surface area of the heat exchanger. I.e. the heat exchanger may comprise fins on opposite sides of the recess. The fins may extend along the longitudinal axis of the scanner from a back surface of the heat exchanger, as seen in FIGS. 5 and 6A-6B. Each fin has a length defined from the back surface, a width defined across the back surface and a thickness. The length and the thickness of the fins can be seen in the side view in FIG. 6A, whereas the width (and the thickness) of the fins can be seen in the end view in FIG. 6B. If air is just blown directly through the heat exchanger, a lot of turbulence can be generated at the air outlet side of the heat exchanger, e.g. when outlet air hits the inner side of the outer shell. With an asymmetric design of the heat exchanger, the airflow can be gently guided from the inlet passage and over to the outlet passage (and turned 180 degrees) only generating a minimal amount of turbulence, thereby allowing the thermal capacity of the heat exchanger to be optimized even though only a minimal amount of volume is available within the compact scanner. As part of an asymmetric heat exchanger the height and/or the width of the fins may be larger on the air outlet side than on the air inlet side. With an asymmetric heat exchanger the total surface area of the fins of the air inflow side may be less than 100% of the total surface area of the fins of the air outflow side, such less than 75% or less than 50%. The arrangement of the fins may define a recess, and the fan can be positioned in this recess. The back surface of the heat exchanger may furthermore form at least one concave surface, preferably two concave surfaces, for guiding air flowing through the heat exchanger in a predefined air flow pattern and/or for reducing turbulence in air flow through the heat exchanger.

The efficiency of the presently disclosed cooling approach can be quantified by the ratio of the flow rate of air blown out of the air outlet and the flow rate of air drawn through the air inlet, during operation of the scanner. Alternative or supplemented by the ratio of the flow rate of air passing through the fan and the flow rate of air drawn through the air inlet, during operation of the scanner. Maximization of these ratios is an indication that the recirculation of hot air inside the scanner is minimized. Hence, preferably the flow rate of air blown out of the air outlet is at least 50%, more preferably at least 60%, yet more preferably at least 70%, even more preferably at least 80%, most preferably at least 90%, of the flow rate of air drawn through the air inlet, during operation of the scanner. Similarly the flow rate of air passing through the fan is preferably at least 50%, more preferably at least 60%, yet more preferably at least 70%, even more preferably at least 80%, most preferably at least 90%, possibly even 95% of the flow rate of air drawn through the air inlet, during operation of the scanner.

Aerogel Layer

The outside surface temperature of the presently disclosed intraoral scanner may be further reduced by provision of a thermally insulating layer between the internal components and the outer shell, however that typically has the consequence that the temperature of the internal components is slightly elevated. I.e. the internal temperature of scanner will increase whereas the outer surface temperature of the scanner will decrease. But this is typically acceptable because the critical operating temperature threshold of the internal scanner components generally are much higher than the required outer shell temperatures. Such a thermally insulating layer for the scanner must typically be very thin due to the limited space available underneath the enclosure. Use of for example an aerogel insulator film can lower the surface temperature of the outer shell of the scanner by 1.5-2.5° C. And a surface temperature reduction of at least 1 degree C. can be achieved by using an aerogel insulation film with a thickness of only 0.3 mm.

Hence, a further embodiment of the presently disclosed scanner comprises an outer insulation layer for passively heat separating interior elements of the intraoral scanner, such as the electronic components, from the outer shell housing. The outer insulation layer may be made of aerogel. The outer insulation layer is preferably in contact with an inner surface of the outer shell housing or at least positioned within 5 mm of the inner surface of the outer shell housing. The outer insulation layer is preferably less than 1 mm thick, less than 0.8 mm thick, or less than 0.5 mm thick, preferably less than 0.4 mm thickness, such as 0.3 mm thickness.

EXAMPLES

FIG. 1 is an exploded perspective view of one embodiment of the presently disclosed intraoral scanner 1. The outer shell housing 3 defines the outermost layer of the scanner 1. A battery 2 provides the power and is inserted in the proximal end of the scanner 1. A distal end 3' of the outer shell housing protects the light emitting distal end of the scanner 1 that enters the oral cavity of the patient during intraoral scanning. The user of the scanner, e.g. a dentist, operates the scanner 1 by holding the outer shell housing 3 and the presently disclosed cooling systems is provided to minimize the temperature of the outermost layer of the scanner 1. As seen from FIG. 1 the scanner 1 is elongated defining a primary longitudinal axis.

Figure 2:
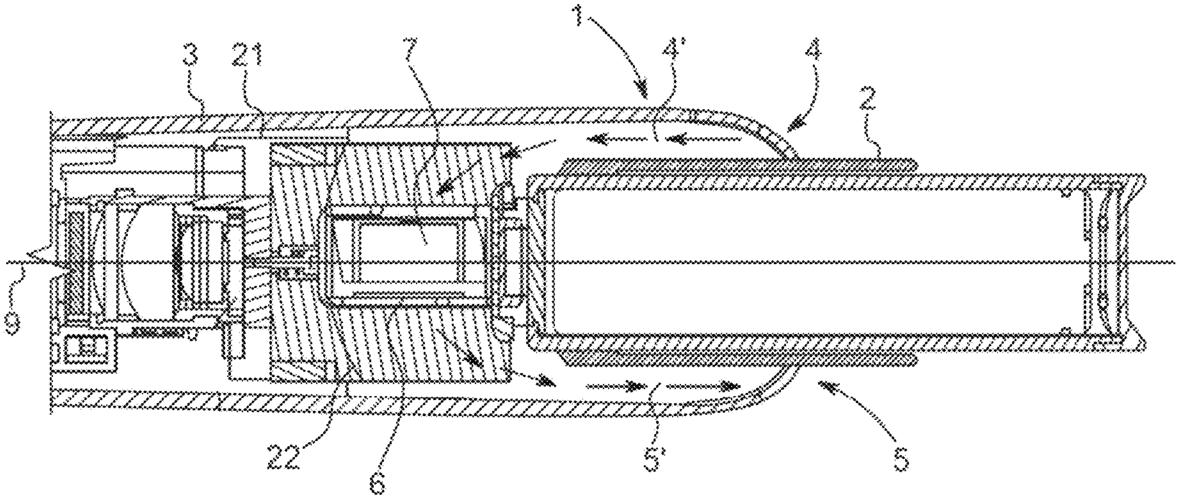
FIG. 2 is a cross-sectional top view of one embodiment of the presently disclosed intraoral scanner showing part of the cooling system.

FIG. 2 is a cross-sectional top view of one embodiment of a part of the presently disclosed intraoral scanner 1 showing part of the cooling system, i.e. only the proximal part of the scanner 1 is shown. The battery 2 is located in the proximal end of the scanner and a heat exchanger 6 in the form of a heat sink is located in extension of the battery 2. A fan 7 is mounted inside the heat exchanger 6. An air sealing is provided along the line 9 which also marks the longitudinal axis of the scanner 1. The line 9 may be coincident with a vertical plane 28 of the scanner. As seen, in this embodiment the fan 7 is oriented such that the axis of rotation is orthogonal to the line 9. In particular, the axis of rotation may be parallel to a surface normal of the vertical plane 28. The vertical plane may be understood as extending in/out of the cross-sectional top view. When the fan 7 is rotating, outside air is sucked into the scanner 1 via air inlet 4 located in the proximal end of the scanner and passes to the heat exchanger 6 via inlet passage 4' that extends along the longitudinal axis of the scanner 1. The configuration of the heat exchanger 6, the fan 7 and air flow guides ensure that the air passes through the heat exchanger, thereby cooling the heat exchanger, and further on to the outlet passage 5' and out through air outlet 5, also located in the proximal end of the scanner 1. Curved air flow guides 21, 22 are provided at the distal end of the inlet passage 4' and outlet passage 5' to reduce turbulence and optimize guidance of the air flow from the inlet passage 4' to the inlet passage 5'. As seen in FIG. 2 the air flow guide 21 at the distal end of the inlet passage 4' is not equal to and/or is not arranged symmetrically relative to the air flow guide 22 at the distal end of the outlet passage 5'.

Figure 3A:
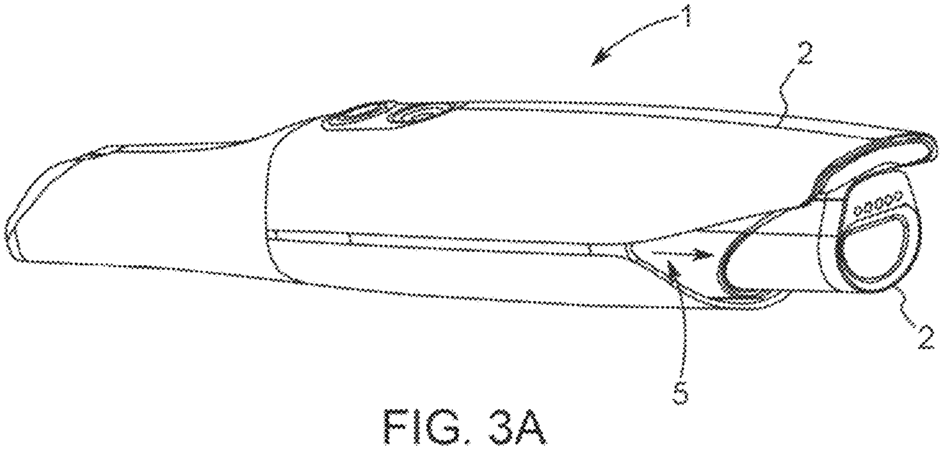
FIGS. 3A-B show perspective and proximal views of one embodiment of the presently disclosed intraoral scanner.
Figure 3B:
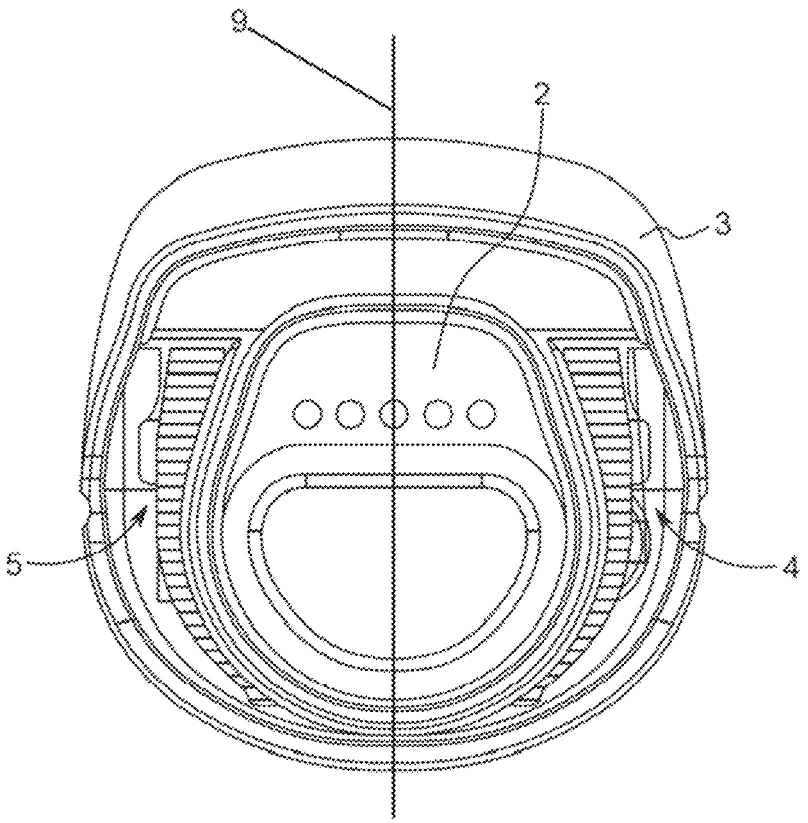

FIG. 3A shows a perspective proximal view of one embodiment of the presently disclosed intraoral scanner where the battery 2 is mounted in the proximal end of the scanner 1. The air outlet 5 is visible in FIG. 3A. The proximal end view in FIG. 3B shows both the air inlet 4 located in the right side of the scanner 1 and the air outlet 5 located in the left side of the scanner 1, i.e. on each side of the battery 2. The line 9 splits the scanner 1 in two halves, i.e. a “cool side” with the air inlet 4 and a “hot side” with the air outlet 5. An air sealing is provided along the line 9 such that there is substantially no fluid connection between the “cool side” and the “hot side” of the scanner 1, excepts through the fan and the heat exchanger as illustrated in FIG. 2. The line 9 may be coincident with the vertical plane 28.

Figure 4:
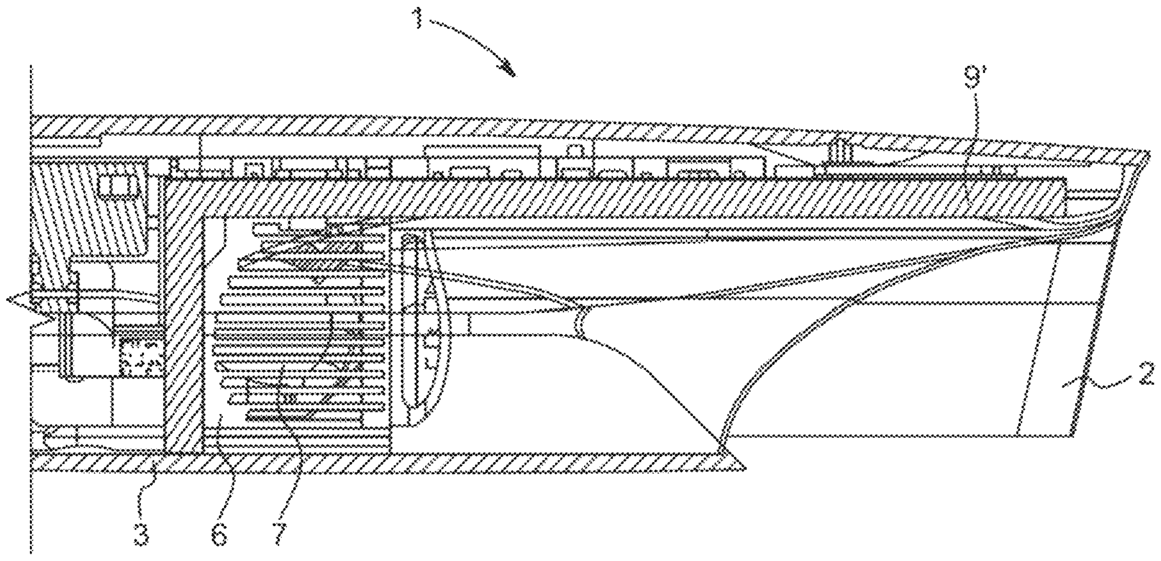
FIG. 4 is a cross-sectional side view of one embodiment of the presently disclosed intraoral scanner showing part of the cooling system.

FIG. 4 is a cross-sectional side view of one embodiment of the presently disclosed intraoral scanner 1 where the outer shell housing 3 is shown as the outermost layer. The line 9' marks the extension of the air sealing, i.e. extending longitudinally from the proximal end of the scanner 1, along the battery 2 and part of the heat exchanger 6, and then extending vertically behind the 7, such that air does not pass further towards the distal end of the scanner, but is guided out through the outlet passage 5' and air outlet 5.

Figure 7:
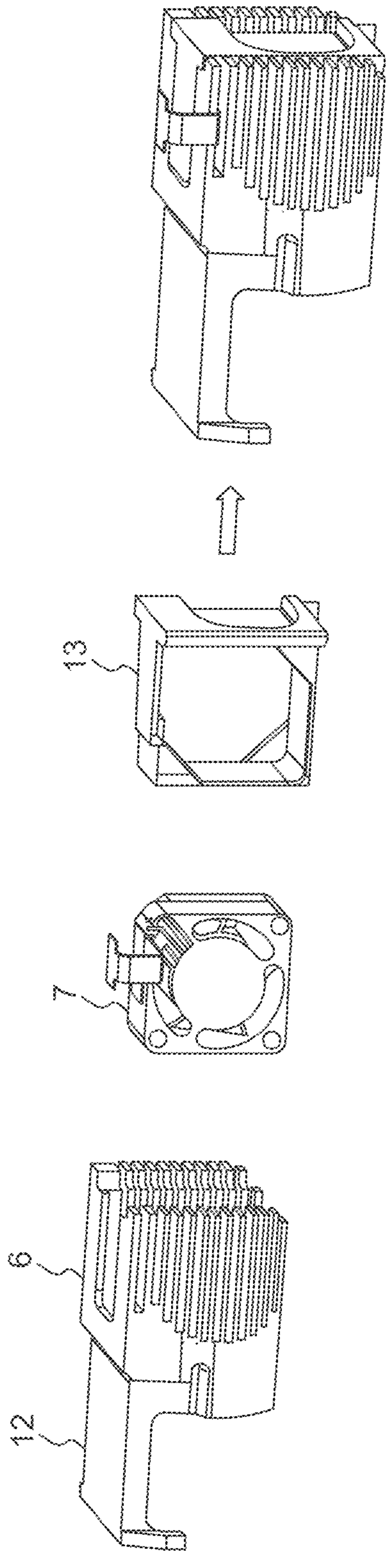
FIG. 7 is an exploded perspective view of exemplary heat exchanger and corresponding fan.

FIGS. 5 and 6A-6B show various illustrations an exemplary heat exchanger 6 and FIG. 7 illustrates how a fan 7 can be integrated in the heat exchanger. The heat exchanger comprises fins 11 to increase the surface area. A distal part of the heat exchanger 6 comprises a flat surface 12 for large thermal contact with a heat dissipation element 10 (see FIG. 13). A recess 10 is provided in a proximal part of the heat exchanger 6 such that a fan 7 can be integrated between the fins 11. The fan 7 is an axial flow fan and is integrated in the heat exchanger 6 such that the axis of rotation of the fan 7 is perpendicular to the longitudinal axis of the scanner 1. Prior art scanners typically have an axial flow fan with the axis of rotation of the fan parallel with the longitudinal axis of the scanner such that air can easily be sucked in along the longitudinal axis of the scanner. However, such an arrangement of the fan makes it difficult to get rid of the heated air. The present inventors have realized that by angling the fan relative to the longitudinal axis the flow of air inside the scanner can be better controlled whereby heated air can be better guided out of the scanner, thereby improving the thermal management.

As seen in the figures the back surface of the heat exchanger is concave which further helps to improve the guidance of the airflow from the inlet passage to the outlet passage via the fan and the heat exchanger.

A gasket 13 is provided to encase the fan 7 helping to separate the inlet passage 4' of the “cold side” of the scanner 1 from the outlet passage 5' of the “hot side” of the scanner 1 such that the only fluid connection between inlet passage 4' and outlet passage 5' is through the fan and the fins 11 of the heat exchanger 6.

As seen in the end view of the heat exchanger in FIG. 6B the fan 6 and gasket 13 is arranged slightly asymmetric inside the heat exchanger 6, i.e. not in the centre, such that the width of the fins on the air inlet side 4" is smaller than the width of the fins on the air outlet side 5" of the heat exchanger 6.

Figure 8A:
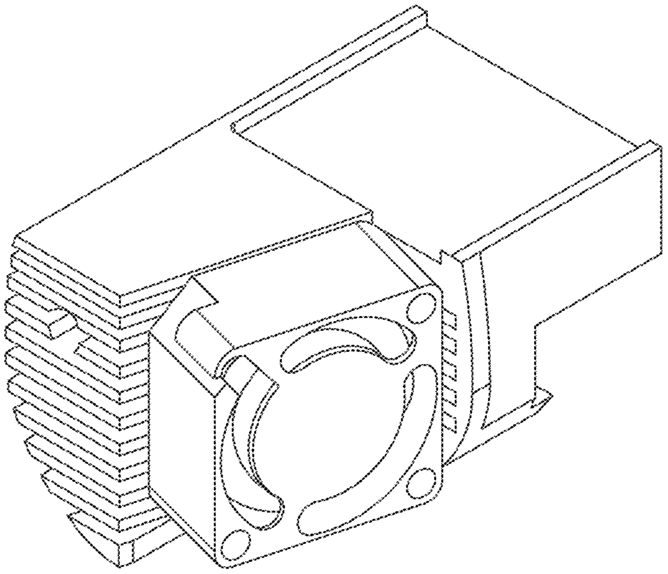
FIGS. 8A-D show perspective views of different embodiment of heat exchanger and fan.
Figure 8B:
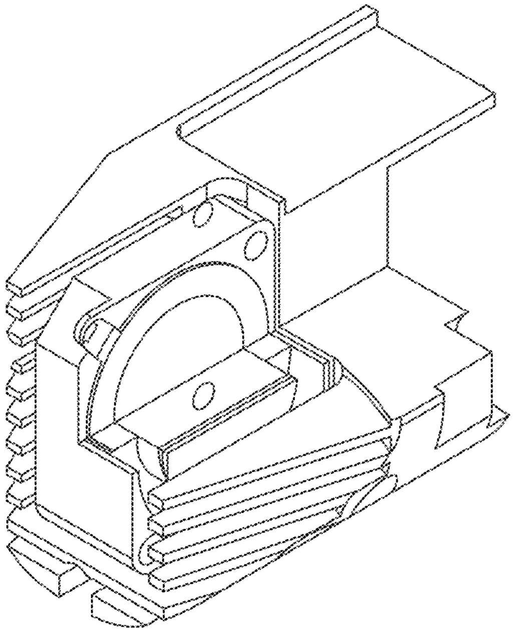
Figure 8C:
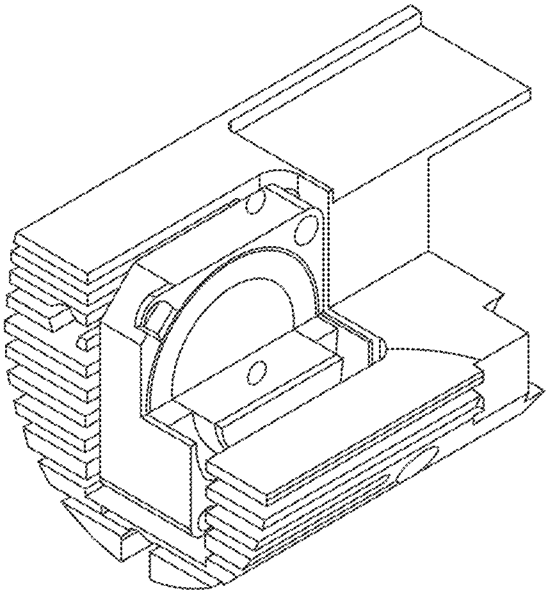
Figure 8D:
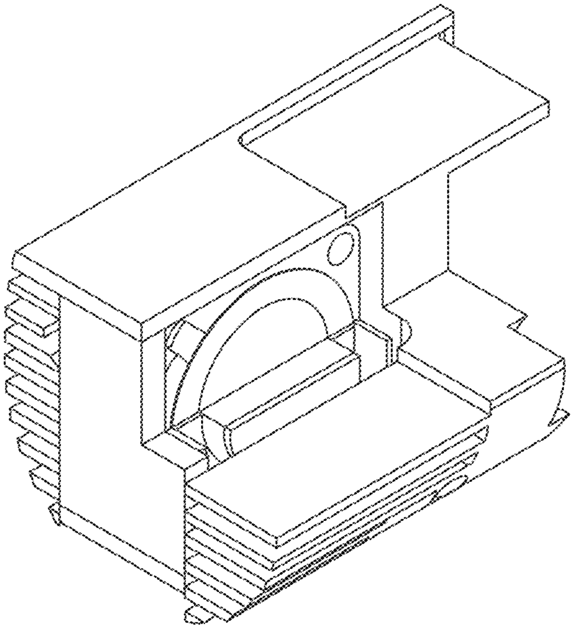

There are many ways to arrange the fan 7 and the heat exchanger 6 and FIGS. 8A-8D show for examples. FIG. 8A shows the heat exchanger 6 and fan 7 from FIG. 7 integrated in a scanner. FIG. 8B shows an example where there are no fins of the heat exchanger on the air inlet side of the fan and only fins on the air outlet side of the fan. The fan is also angled (but not perpendicular) relative to the longitudinal axis of the scanner. Such an asymmetrical heat exchanger can better utilize the high air flow pressure on the outlet side of the fan. However, it comes with the cost more difficult mounting and reduced overall surface area of the heat exchanger. FIG. 8C shows an example (partly cut-through view) with the fan integrated between the fins of the heat exchanger, and where the fins of the heat exchanger have increased width on both the air inlet side and the air outlet side to increase the surface area of the heat exchanger. FIG. 8D shows an example (partly cut-through view) with the fan integrated between the fins of the heat exchanger, and where a plate is covering the fan to increase the surface area of the heat exchanger and provide additional thermal conduction to the heat generating components. FIG. 8D shows an example (partly cut-through view) with the fan integrated between the fins of the heat exchanger, but the fins have been shaped to form more aerodynamic airflow guides for optimizing the guidance of airflow from air inlet side to air outlet side and also increase the airflow past the back side of the heat exchanger.

Figure 9A:
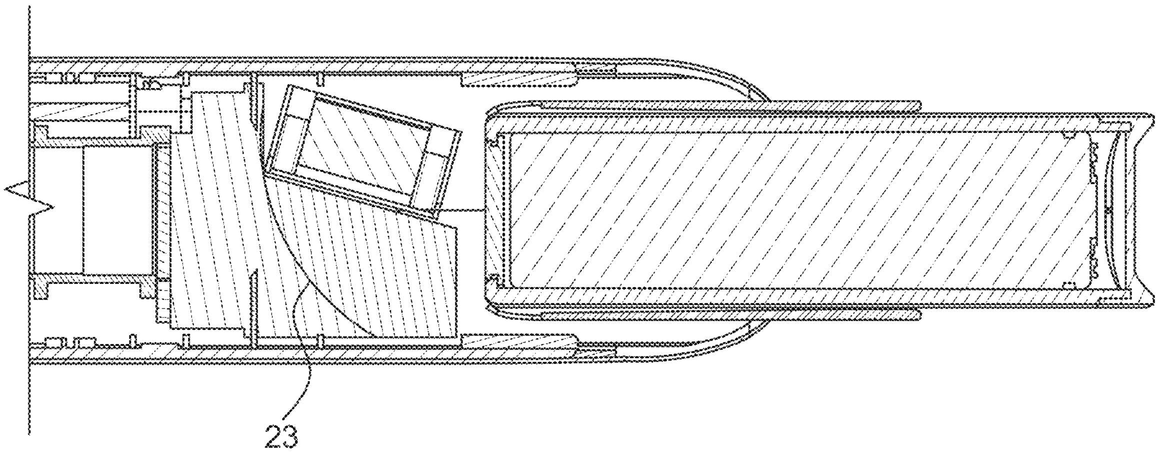
FIGS. 9A-C show cross-sectional top views of the presently disclosed intraoral scanner with different configurations of heat exchanger and fan.
Figure 9B:
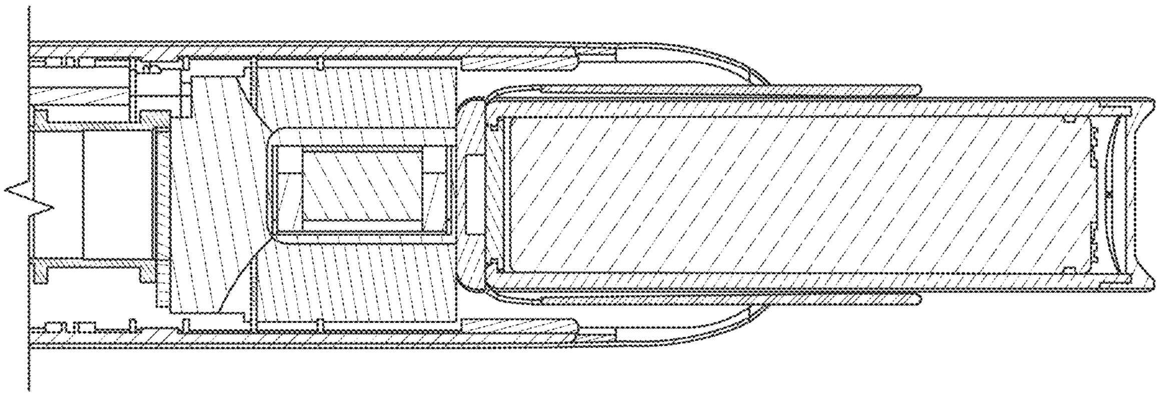
Figure 9C:
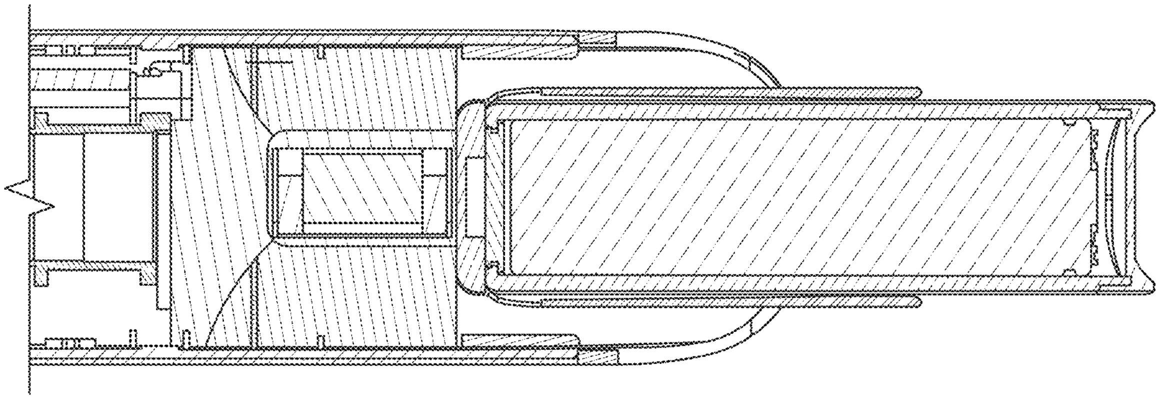

FIGS. 9A-C show cross-sectional top views of the presently disclosed intraoral scanner with different configurations of heat exchanger and fan. FIG. 9A shows the embodiment of FIG. 8A, FIG. 9B shows the embodiment of FIG. 8B, and FIG. 9C shows the embodiment of FIG. 8C. As seen in FIG. 9B a single air flow guide 23 curves all across the scanner to help guide the air flow to the outlet passage 5'. As seen in FIG. 9C the increased width of the heat exchanger also increases the width of the scanner.

Figure 10A:
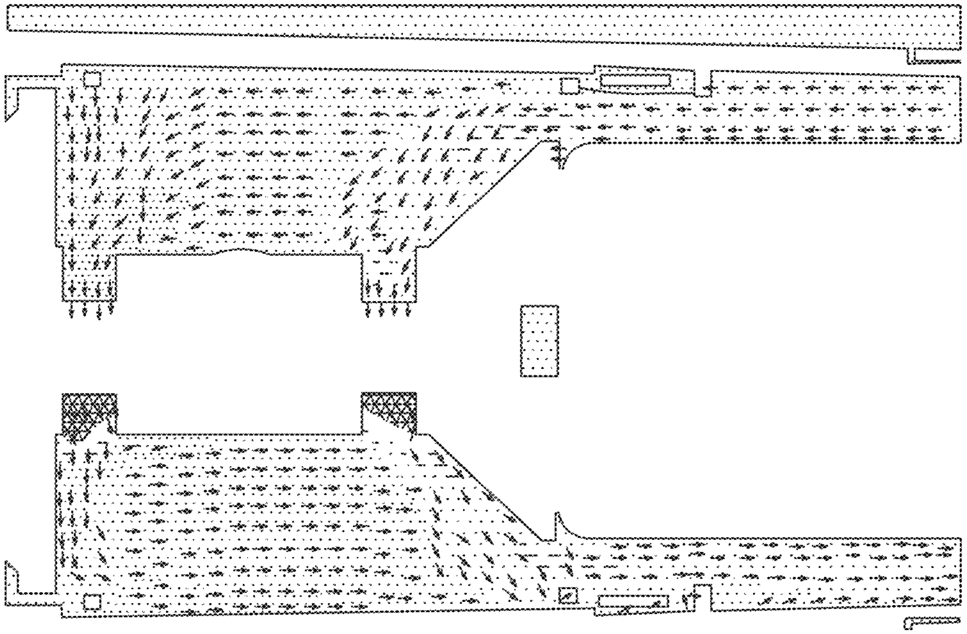
FIGS. 10A-C show cross-sectional top views of heat simulations of the presently disclosed intraoral scanner with different configurations of heat exchanger and fan.
Figure 10B:
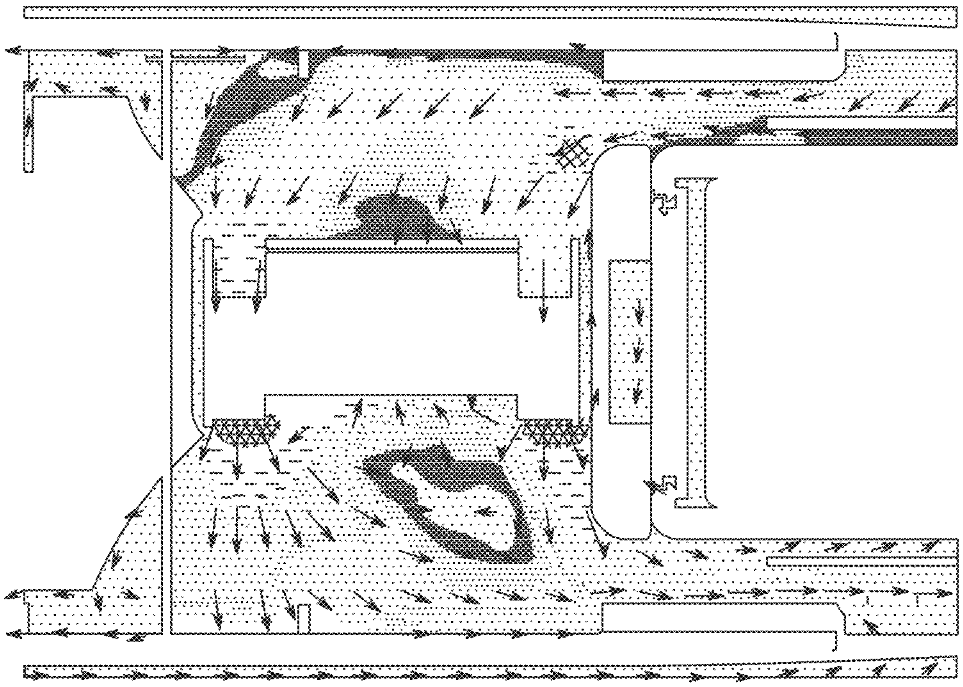
Figure 10C:
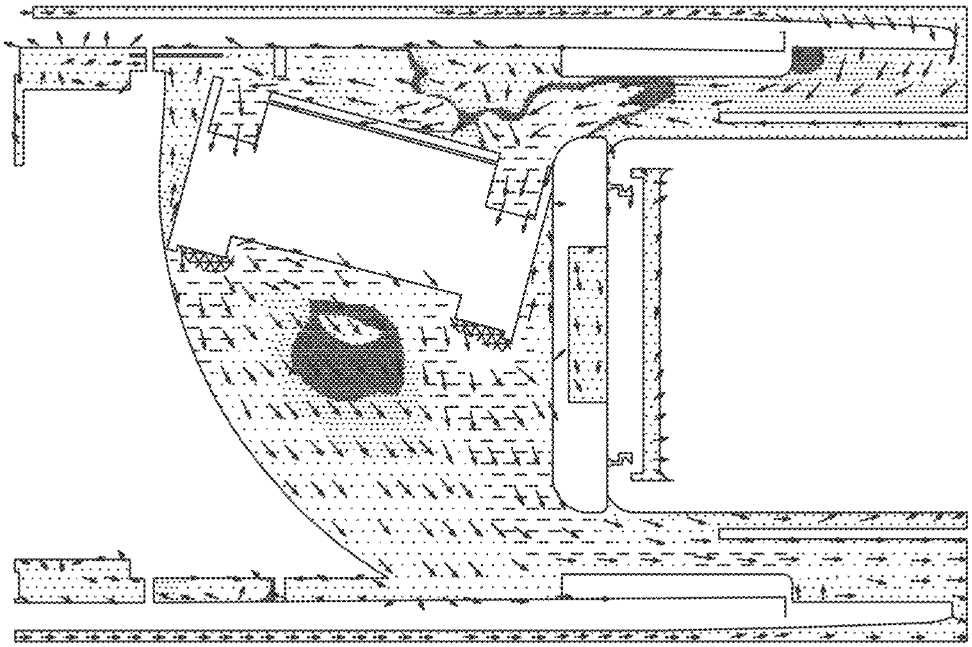

FIGS. 10A-B show cross-sectional top views of heat simulations of the presently disclosed intraoral scanner with different configurations of heat exchanger and fan. FIG. 10A shows heat and air flow simulations of the embodiment of FIG. 9A, whereas FIG. 10B shows heat and air flow simulations of the embodiment of FIG. 9B. As seen in both FIGS. 10A and 10B the amount of turbulence is minimal, and the air flow is quite efficiently guided from the inlet passage 4' to the outlet passage 5'. The air flow in FIG. 10B in the asymmetric configuration is close to optimal, but as stated above the cost is a reduced surface area of the heat exchanger and more difficult mounting.

Figure 11:
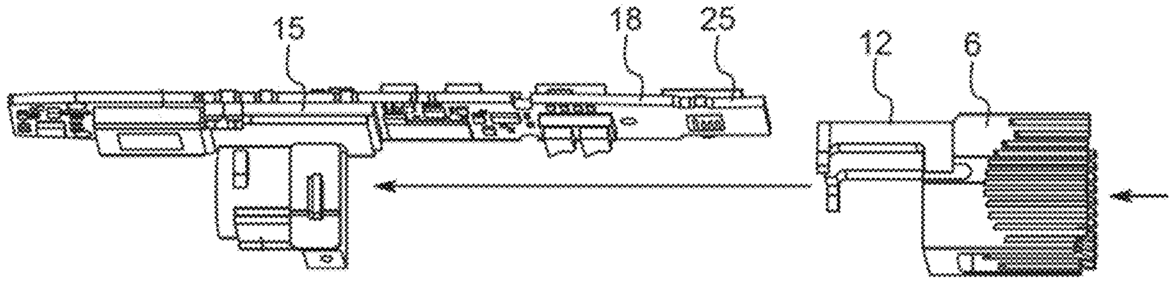
FIG. 11 is an exploded perspective side view of an exemplary main board and heat exchanger.
Figure 12:
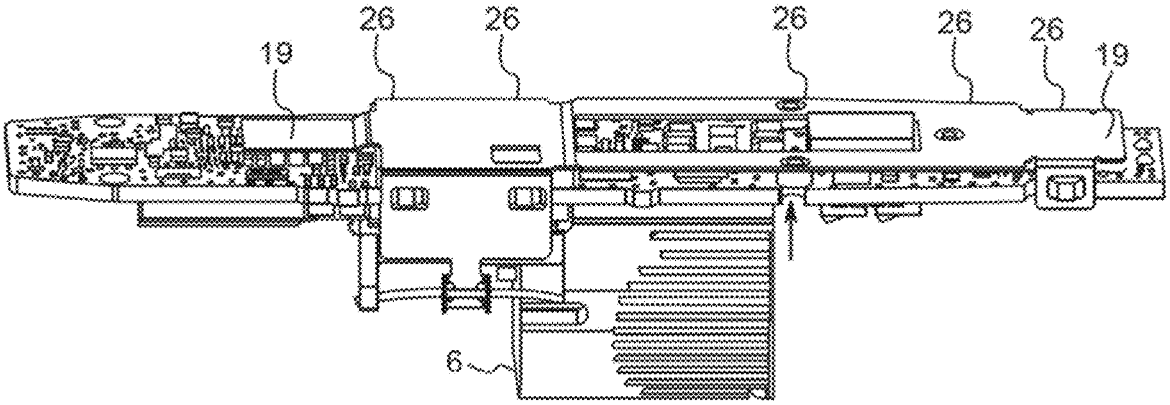
FIG. 12 is a perspective side view of an exemplary main board, heat exchanger and heat dissipation element.
Figure 13:
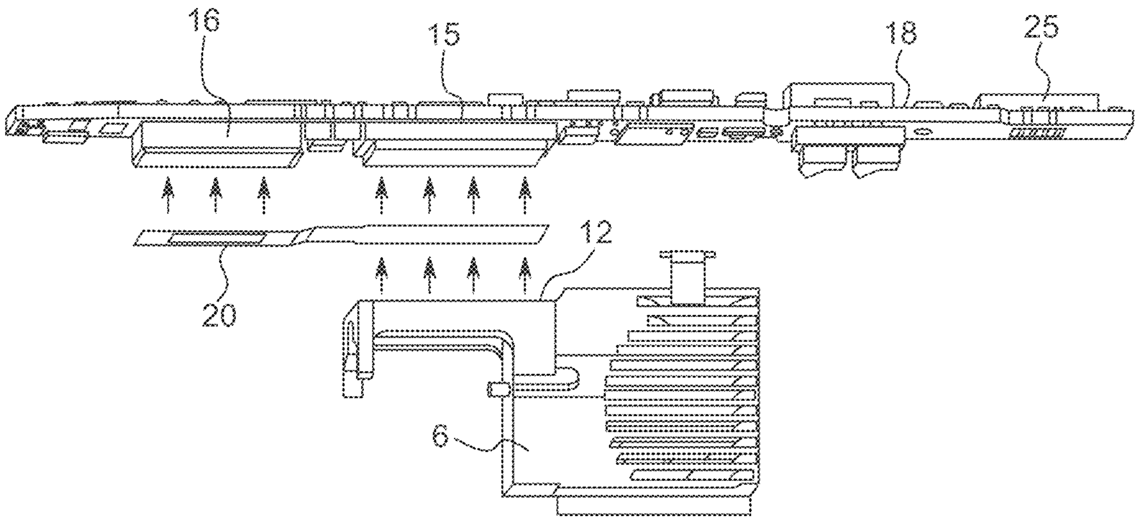
FIG. 13 is a side view of an exploded exemplary main board, heat exchanger and heat dissipation element.

Exemplary configurations of at least some of the heat generating electronic components and illustrated in FIGS. 11-13 showing the heat exchanger, main board and different heat dissipation elements.

FIG. 11 is an exploded perspective side view of an exemplary main board and heat exchanger 6. The main board 18 is elongated and extends along the longitudinal axis in a top part of the scanner 1. A heat dissipation element in the form of a graphite based ("eGraf") thermal interface material (TIM) 20 is located on top of the plate 12 of the heat exchanger 6. The TIM 20 provides thermal conduction contact to the FPGA 15 and image sensor 15 whereas the LED unit is located below the surface plate 12 of the heat exchanger to utilize both surfaces of the plate 12. A spring force maintains the thermal contact between the heat exchanger 6 and the neighbouring electronic components. The WiFi module 25 is located on the proximal end of the main board 18.

Cooling of the WiFi module (and remaining components on the main board) is provided by an elongated heat dissipation element in the form of a copper plate 19, which has direct thermal contact with the heat exchanger 6 and also functions as an EMC shield and ground connector of the main board by means of the ground points 26.

Figure 14:
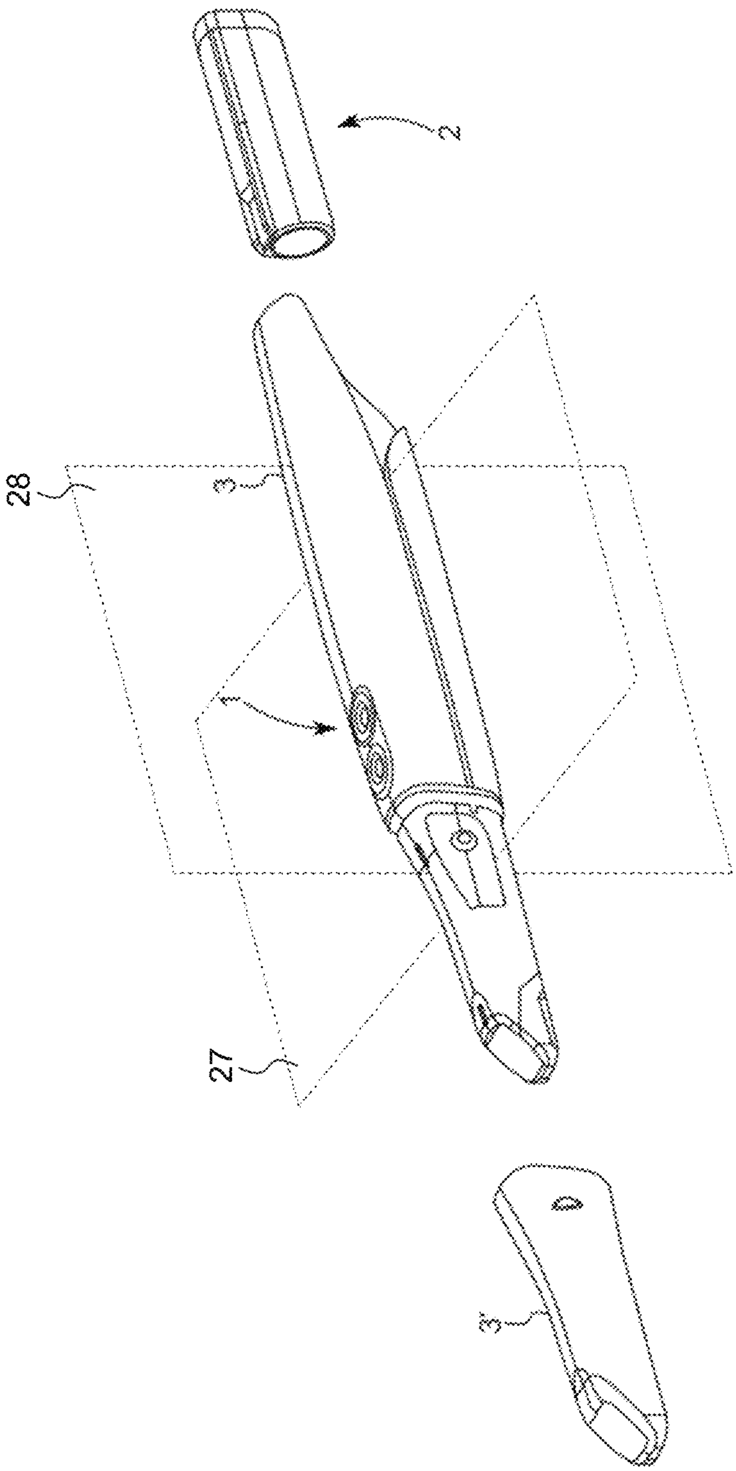
FIG. 14 is the same embodiment as shown in FIG. 1. However, in this drawing, two planes (27, 28) are shown. The planes are only shown for illustrative purposes e.g. to aid in defining the orientation of the fan.

FIG. 14 shows the same embodiment as shown in FIG. 1. In this drawing, a horizontal plane 27 and a vertical plane 28 are shown for illustrative purposes. The two planes (27, 28) are orthogonal to each other. In some embodiments, the axis of rotation of the fan is parallel with the horizontal plane 27. As an example, the axis of rotation may be parallel to the horizontal plane 27 and it may further be non-parallel to the vertical plane 28. In some embodiments, the axis of rotation of the fan is orthogonal to the vertical plane 28 and parallel with the horizontal plane 27. In other embodiments, the axis of rotation defines an angle with respect to the vertical plane 28. The vertical plane 28 may be coincident with the vertical axis and the longitudinal axis of the scanner. The horizontal plane may be coincident with the horizontal axis and the longitudinal axis of the scanner.

Items

1. An intraoral scanner for scanning a dental object, comprising:
   - a heat exchanger for removing heat from one or more electronic components located within the scanner, wherein said heat is generated heat during use of the scanner,
   - an axial-flow fan having a shaft with blades defining an axis of rotation, wherein the axial-flow fan is configured to force air to move through the fan in a direction substantially parallel to the axis of rotation, wherein the axis of rotation is parallel with a horizontal plane of the scanner;
   - an air inlet, an air outlet, an inlet passage, and an outlet passage, wherein the inlet passage extends between the air inlet and the heat exchanger, and wherein the outlet passage extends between the heat exchanger and the air outlet, and wherein the air inlet and the air outlet are separated and located in a proximal end of the intraoral scanner.
2. An intraoral scanner for scanning a dental object, comprising
   - an outer shell housing defining a (primary) longitudinal axis of the scanner, the outer shell housing accommodating
     - one or more electronic components generating heat during use, components such as a battery, a light source, an image sensor, a WiFi module, an integrated circuit, e.g. a power management integrated circuit (PMIC) and/or a processing unit, e.g. a field-programmable gate array (FPGA), and
   - a cooling system for removing heat from the electronic component(s), the cooling system comprising a heat exchanger, such as a heat sink, and a fan.
3. The intraoral scanner according to any of the preceding items, wherein the fan is configured for blowing air past and/or through the heat exchanger.
4. The intraoral scanner according to any of the preceding items, wherein the fan is mounted at least partly inside the heat exchanger.
5. The intraoral scanner according to any of the preceding items, wherein the cooling system comprises an inlet passage and an outlet passage.
6. The intraoral scanner according to item 5, wherein the inlet passage and/or the outlet passage is/are extending parallel with the longitudinal axis.
7. The intraoral scanner according to any of the preceding items, wherein the inlet passage and the outlet passage are located in the same plane, such as in a horizontal plane of the scanner.

8. The intraoral scanner according to any of the preceding items 5-7, wherein the battery extends along the longitudinal axis of the scanner and wherein the inlet passage, and preferably also the outlet passage, extends along the battery such that a flow of air is provided along the battery.

9. The intraoral scanner according to any of the preceding items 5-8, configured such that during cooling operation the fan 1) sucks air through the inlet passage along a first direction of the longitudinal axis, such that the air passes the heat exchanger to cool the heat exchanger and heat the air, and 2) blows the heated air though the outlet passage along a second direction of the longitudinal axis which is opposite to the first direction.

10. The intraoral scanner according to any of the preceding items 5-9, wherein the heat exchanger and the orientation and location of the fan are configured such that during cooling operation air enters through the inlet passage to the heat exchanger along a first direction of the longitudinal axis, and exits from the heat exchanger through the outlet passage along a second opposite direction of the longitudinal axis.

11. The intraoral scanner according to any of the preceding items 5-10, wherein the heat exchanger and the orientation and location of the fan are configured such that during transport from the inlet passage to the outlet passage, via the fan and the heat exchanger, the flow of the air is reversed 180 degrees.

12. The intraoral scanner according to any of the preceding items 5-11, wherein the inlet passage and the outlet passage are physically separated passages.

13. The intraoral scanner according to any of the preceding items, wherein the intraoral scanner comprises an air inlet, an air outlet, an inlet passage, and an outlet passage for the cooling system.

14. The intraoral scanner according to any of the preceding items 5-13, wherein the inlet passage extends between an air inlet and the heat exchanger, and wherein the outlet passage extends between the heat exchanger and an air outlet, and wherein the air inlet and the air outlet are separated and located in a proximal end of the intraoral scanner.

15. The intraoral scanner according to any of the preceding items 5-14, comprising an air sealing extending along the longitudinal axis and configured for separating a first part of the cooling system from a second part of the cooling system, and wherein the inlet passage is located in the first part of the cooling and the outlet passage is located in the second part of the cooling system.

16. The intraoral scanner according to any of the preceding items 5-15, wherein the inlet passage and/or the outlet passage are at least partly sealed to prevent air leaks and/or recirculation of air.

17. The intraoral scanner according to any of the preceding items 5-16, wherein the outlet passage and optionally the inlet passage are sealed to prevent air leaks and/or recirculation of air.

18. The intraoral scanner according to any of the preceding items 5-17, wherein the inlet passage and the outlet passage are physically separated at least partly by the battery.

19. The intraoral scanner according to any of the preceding items, wherein the flow rate of air blown out of the air outlet is at least 50%, more preferably at least 60%, yet more preferably at least 70%, even more preferably at least 80%, most preferably at least 90%, of the flow rate of air drawn through the air inlet, during operation of the scanner.

20. The intraoral scanner according to any of the preceding items, wherein the flow rate of air blown drawn through the air inlet is at least 50%, more preferably at least 60%, yet more preferably at least 70%, even more preferably at least 80%, most preferably at least 90%, of the flow rate of air passing through the fan, during operation of the scanner.

21. The intraoral scanner according to any of the preceding items, wherein the fan is an axial-flow fan having a shaft with blades defining an axis of rotation, the axial-flow fan configured to force air to move parallel to the axis of rotation.

22. The intraoral scanner according to any of the preceding items, wherein the fan defines an axis of rotation which is non-parallel with the longitudinal axis, preferably substantially perpendicular to the longitudinal axis.

23. The intraoral scanner according to any of the preceding items, wherein the fan defines an axis of rotation which is non-parallel with the longitudinal axis, such that the fan's axis of rotation forms an angle with the longitudinal axis of between 45 and 90 degrees, more preferably between 60 and 90 degrees, even more preferably between 70 and 80 degrees, most preferably between 80 and 90 degrees.

24. The intraoral scanner according to any of the preceding items, wherein the axis of rotation is parallel with a horizontal plane of the scanner, and wherein the axis of rotation forms an angle with a vertical plane of the scanner of between 45 and 90 degrees, more preferably between 60 and 90 degrees, even more preferably between 70 and 80 degrees, most preferably between 80 and 90 degrees.

25. The intraoral scanner according to any of the preceding items, wherein the axis of rotation is parallel with a vertical plane of the scanner, and wherein the axis of rotation forms an angle with a horizontal plane of the scanner of between 45 and 90 degrees, more preferably between 60 and 90 degrees, even more preferably between 70 and 80 degrees, most preferably between 80 and 90 degrees.

26. The intraoral scanner according to any of the preceding items, wherein a right side and a left side of the outer shell housing defines a horizontal axis of the scanner, and wherein a top side and a bottom side of the outer shell housing defines a vertical axis of the scanner, and wherein the fan defines an axis of rotation which is non-parallel with the longitudinal axis and parallel with the horizontal axis, such that the fan's axis of rotation forms an angle with the longitudinal axis of between 45 and 90 degrees, more preferably between 60 and 90 degrees, even more preferably between 70 and 80 degrees, most preferably between 80 and 90 degrees.

27. The intraoral scanner according to any of the preceding items, wherein the heat exchanger comprises an air inflow side and an air outflow side and wherein the air inlet side is different from the air outlet side such that the heat exchanger is asymmetric.

28. The intraoral scanner according to item 27, wherein the fan separates the air inflow side from the air outflow side in the heat exchanger.

29. The intraoral scanner according to any of the preceding items, wherein the heat exchanger comprises fins.

30. The intraoral scanner according to any of the preceding items, wherein the heat exchanger comprises fins and wherein the fan is mounted between the fins of the heat exchanger such that the fan is configured for blowing air through the fins of the heat exchanger.

31. The intraoral scanner according to any of the items 29-30, wherein the total surface area of the fins of the air inflow side is less than 100% of the total surface area of the fins of the air outflow side, such less than 75% or less than 50%.

32. The intraoral scanner according to any of the items 29-31, wherein the fins define a recess, and wherein the fan is positioned in the recess.

33. The intraoral scanner according to item 32, wherein the heat exchanger comprises fins on opposite sides of the recess.

34. The intraoral scanner according to any of the preceding items 29-33, wherein the fins extend along the longitudinal axis of the scanner from a back surface of the heat exchanger, each fin having a height defined from the back surface and a width defined across the back surface.

35. The intraoral scanner according to any of the preceding items 29-34, wherein the back surface of the heat exchanger forms at least one concave surface, preferably two concave surfaces, for guiding air flowing through the heat exchanger in a predefined air flow pattern and/or for reducing turbulence in air flow through the heat exchanger.

36. The intraoral scanner according to any of the preceding items 34-35, wherein the height and/or the width of the fins is larger on the air outlet side than on the air inlet side.

37. The intraoral scanner according to any of the preceding items, wherein the heat exchanger is formed from a single piece of material, such as metal.

38. The intraoral scanner according to any of the preceding items 5-37, wherein the cooling system comprises a fan gasket surrounding the fan and configured for providing sealing between the inlet passage and the outlet passage such that air passage between inlet and outlet passages is exclusively through the fan.

39. The intraoral scanner according to any of the preceding items, wherein the cooling system comprises at least one heat dissipation element thermally connected to the heat exchanger and at least one of said electronic components, such as a Wi-Fi module, preferably located in a proximal end of the intraoral scanner.

40. The intraoral scanner according to item 39, configured such that the electronic components are primarily cooled by thermal conduction between at least one heat dissipation element and the heat exchanger, whereas the heat exchanger is primarily cooled by air.

41. The intraoral scanner according to any of the preceding items 39-40, comprising an elongated heat dissipation element in the form of a thermally conductive and electrically conductive plate, preferably metallic, such as made of copper, and connected to a ground plane of a main board of the intraoral scanner.

42. The intraoral scanner according to item 41, wherein the elongated heat dissipation element extends along the inlet passage.

43. The intraoral scanner according to any of the preceding items 41-42, wherein the elongated heat dissipation element is connected to the ground plane in a plurality of connecting points.

44. The intraoral scanner according to item 43, wherein neighboring connecting points are separated by less than 30 mm.

45. The intraoral scanner according to any of the preceding items 39-44, comprising a graphite based heat dissipation element.

46. The intraoral scanner according to item 45, wherein the graphite based heat dissipation element is thermally connected to an image sensor and/or a field-programmable gate array (FPGA).

47. The intraoral scanner according to any of the preceding items, comprising an outer insulation layer for passively heat separating interior elements of the intraoral scanner, such as the electronic components, from the outer shell housing.

48. The intraoral scanner according to item 47, wherein the outer insulation layer is made of aerogel.

49. The intraoral scanner according to any of the preceding items 47-48, wherein the outer insulation layer is in contact with an inner surface of the outer shell housing or at least with positioned within 5 mm of the inner surface of the outer shell housing.

50. The intraoral scanner according to any of the preceding items 47-49, wherein the outer insulation layer is less than 1 mm thick, less than 0.8 mm thick, or less than 0.5 mm thick, preferably less than 0.4 mm thickness, such as 0.3 mm thickness.

51. A method for cooling an intraoral scanner, comprising the steps of:

sucking air through an inlet passage to a heat exchanger along a first direction, guiding the air past and/or through the heat exchanger to an outlet passage, blowing the air out of the scanner through the outlet passage, separated from the inlet passage, along a second direction substantially parallel with the first direction, wherein the air flow is reversed when guided from the inlet passage to the outlet passage via the heat exchanger, such that the first direction of the inlet airflow is substantially opposite to the second direction of the outlet airflow.

52. The method of item 51, wherein the intraoral scanner defines a longitudinal axis extending in parallel with an elongated outer shell of the intraoral scanner, and wherein the first and second direction are parallel with the longitudinal axis.

53. The method of any of items 51-52, wherein the scanner is the intraoral scanner according to any of items 1-50.

Although some embodiments have been described and shown in detail, the disclosure is not restricted to such details, but may also be embodied in other ways within the scope of the subject matter defined in the following claims. In particular, it is to be understood that other embodiments may be utilized, and structural and functional modifications may be made without departing from the scope of the present disclosure. Furthermore, the skilled person would find it apparent that unless an embodiment is specifically presented only as an alternative, different disclosed embodiments may be combined to achieve a specific implementation and such specific implementation is within the scope of the disclosure.

A claim may refer to any of the preceding claims, and “any” is understood to mean “any one or more” of the preceding claims.

It should be emphasized that the term “comprises/comprising/including” when used in this specification is taken to specify the presence of stated features, integers, operations, steps or components but does not preclude the presence or addition of one or more other features, integers, steps, components or groups thereof.

The invention claimed is:

1. An intraoral scanner for scanning a dental object, comprising:

an outer shell housing having a longitudinal axis, the outer shell housing including an air inlet and an air outlet, wherein the air inlet and the air outlet are separated and located in an end of the outer shell housing;

a heat exchanger within the outer shell housing for removing heat from one or more electronic components, wherein said heat is generated heat during use of the intraoral scanner, the heat exchanger including a surface plate portion extending in a direction of the longitudinal axis of the outer shell housing, and fins;

the one or more electronic components thermally connected to and arranged at least in part on the surface plate portion of the heat exchanger;

an axial-flow fan having a shaft with blades defining an axis of rotation, wherein the axial-flow fan is configured to force air to move through the axial-flow fan in a direction substantially parallel to the axis of rotation, wherein the axis of rotation is perpendicular to the longitudinal axis of the outer shell housing, and the axial-flow fan is mounted between the fins of the heat exchanger such that the axial-flow fan is configured for blowing the air through the fins of the heat exchanger;

an air passage within the outer shell housing and is formed by an inlet passage extending between the air inlet and the heat exchanger, through the fins of the heat exchanger, though the axial-flow fan, and an outlet passage extending between the heat exchanger and the air outlet, the inlet passage and the outlet passage are each parallel with the longitudinal axis and physically separated from each other, and the air passage is sealed from a rest of the intraoral scanner, the rest of the intraoral scanner including the one or more electronic components and the surface plate portion of the heat exchanger.

2. The intraoral scanner according to claim 1, wherein the axial-flow fan is mounted between the fins of the heat exchanger such that the axial-flow fan is configured for blowing the air through the fins of the heat exchanger.

3. The intraoral scanner according to claim 1, wherein the fins define a recess, and wherein the axial-flow fan is positioned in the recess.

4. The intraoral scanner according to claim 1, wherein a back surface of the heat exchanger forms at least one concave surface for guiding the air flowing through the heat exchanger in a predefined air flow pattern and/or for reducing turbulence in a flow of the air through the heat exchanger.

5. The intraoral scanner according to claim 1, configured such that, during operation, the axial-flow fan sucks the air through the inlet passage along a first direction of the longitudinal axis, such that the air passes the heat exchanger to heat the air, and blows the heated air through the outlet passage along a second direction of the longitudinal axis which is opposite to the first direction.

6. The intraoral scanner according to claim 1, wherein the heat exchanger and an orientation and location of the axial-flow fan are configured such that during transport from the inlet passage to the outlet passage, via the axial-flow fan and the heat exchanger, a flow of the air is reversed 180 degrees, such that the air is expelled through the air outlet.

7. The intraoral scanner according to claim 1, wherein the outlet passage is sealed to prevent leaks of the air and/or recirculation of the air.

8. The intraoral scanner according to claim 1, wherein the heat exchanger comprises an air inflow side and an air outflow side, the air inlet side is different from the air outlet side such that the heat exchanger is asymmetric, and wherein the axial-flow fan mounted between the fins of the heat exchanger separates the air inflow side from the air outflow side.

9. The intraoral scanner according to claim 1, wherein a back surface of the heat exchanger forms at least one concave surface for guiding the air flowing through the heat exchanger in a predefined air flow pattern and/or for reducing turbulence in a flow of the air through the heat exchanger.

10. The intraoral scanner according to claim 1, further comprises a fan gasket surrounding the axial-flow fan and configured for providing sealing between the inlet passage and the outlet passage such that the air passage between the inlet and outlet passages is exclusively through the axial-flow fan.

11. The intraoral scanner according to claim 1, further comprises at least one heat dissipation element thermally connected to the heat exchanger and the one or more the electronic components.

12. The intraoral scanner according to claim 1, wherein a flow rate of the air blown drawn through the air inlet is at least 80% of a flow rate of the air passing through the axial-flow fan, during operation of the intraoral scanner.

13. The intraoral scanner according to claim 1, further comprising an outer insulation layer made of aerogel for passively heat separating the one or more electronic components of the intraoral scanner from the outer shell housing.

14. The intraoral scanner according to claim 11, wherein the intraoral scanner is configured such that the one or more electronic components are primarily cooled by thermal conduction between the at least one heat dissipation element and the heat exchanger, whereas the heat exchanger is primarily cooled by the air.

15. The intraoral scanner according to claim 11, wherein the at least one heat dissipation element is a thermally and electrically conductive plate connected to a ground plane of a main board of the intraoral scanner.

16. A method for removing heat from within an intraoral scanner according to claim 1, comprising steps of:

sucking the air through the inlet passage to the heat exchanger along a first direction, guiding the air through the heat exchanger to the outlet passage, blowing the air out of the intraoral scanner through the outlet passage, separated from the inlet passage, along a second direction substantially parallel with the first direction, wherein a flow of the air is reversed when guided from the inlet passage to the outlet passage via the heat exchanger, such that the first direction of an airflow through the inlet is substantially opposite to the second direction of an airflow through the outlet.

17. The method of claim 16, wherein the first and second directions are parallel with the longitudinal axis.

* * * * *